(12) United States Patent
Chillar et al.

(10) Patent No.: US 8,046,986 B2
(45) Date of Patent: Nov. 1, 2011

(54) METHOD AND SYSTEM FOR CONTROLLING AN EXHAUST GAS RECIRCULATION SYSTEM

(75) Inventors: Rahul J. Chillar, Greenville, SC (US); Robert W. Taylor, Ponte Vedra Beach, FL (US); Peter Martin Maly, Lake Forest, CA (US); Jason D. Fuller, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 994 days.

(21) Appl. No.: 11/953,524

(22) Filed: Dec. 10, 2007

(65) Prior Publication Data

US 2009/0145126 A1 Jun. 11, 2009

(51) Int. Cl.
*F02G 1/00* (2006.01)
(52) U.S. Cl. .......................................... 60/39.52; 60/773
(58) Field of Classification Search ................ 60/39.52, 60/773, 793
See application file for complete search history.

(56) References Cited

U.S. PATENT DOCUMENTS

| | | | |
|---|---|---|---|
| 4,434,613 A * | 3/1984 | Stahl | 60/784 |
| 5,794,431 A | 8/1998 | Utamura et al. | |
| 6,173,562 B1 | 1/2001 | Utamura et al. | |
| 6,202,400 B1 | 3/2001 | Utamura et al. | |
| 6,269,624 B1 * | 8/2001 | Frutschi et al. | 60/783 |
| 6,895,752 B1 * | 5/2005 | Holtman et al. | 60/605.2 |
| 7,421,835 B2 * | 9/2008 | Rabovitser et al. | 60/39.12 |
| 2004/0050037 A1 * | 3/2004 | Betta et al. | 60/286 |
| 2007/0034171 A1 * | 2/2007 | Griffin et al. | 122/479.1 |
| 2010/0126181 A1 * | 5/2010 | Ranasinghe et al. | 60/782 |

OTHER PUBLICATIONS

Rokke, Petter and Johan E. Hustad, "Exhaust Gas Recirculation in Gas Turbines for Reduction of CO2 Emissions; Combustion Testing with Focus on Stability and Emissions", Int. J. of Thermodynamics, vol. 8 (No. 4), pp. 167-173. Sep. 2005.

Wilkes, C. and B. Gerhold, "NOx Reduction From a Gas Turbine Combustor Using Exhaust Gas Recirculation." ASME 80-JPGC/GT-5, Joint Power Generation Conference, Phoenix, AZ, Sep. 28-Oct. 2, 1980.

* cited by examiner

*Primary Examiner* — William Rodriguez
*Assistant Examiner* — Young Choi
(74) *Attorney, Agent, or Firm* — Dale J. Davis; Ernest G. Cusick; Frank A. Landgraff

(57) ABSTRACT

A method and system for controlling an exhaust gas recirculation (EGR) system is provided. The method and system may incorporate a device or devices that continuously monitors an exhaust stream for harmful constituents. The method and system may control components of the EGR system based on the concentration of harmful constituents within the exhaust.

13 Claims, 3 Drawing Sheets

US 8,046,986 B2

METHOD AND SYSTEM FOR CONTROLLING AN EXHAUST GAS RECIRCULATION SYSTEM

This application is related to commonly-assigned U.S. patent application Ser. No. 11/928,038, filed Oct. 30, 2007 and U.S. patent application Ser. No. 11/953,556, filed Dec. 10, 2007.

BACKGROUND OF THE INVENTION

The present invention relates to an exhaust gas recirculation system, and more particularly to a method and system for controlling an exhaust gas recirculation system.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the emitted exhaust through an inlet portion of the turbomachine. The exhaust is then mixed with the incoming airflow prior to combustion. The EGR process facilitates the removal and sequestration of concentrated $CO_2$, and also reduces the NOx and SOx emission levels.

There are a few concerns with the currently known EGR systems. Impurities and moisture within the exhaust gas prevent utilizing a simple re-circulating loop to reduce the generation of emissions, such as SOx emissions. Turbine fouling, corrosion, and accelerated wear of internal turbomachine components would result from introducing the exhaust gas directly to an inlet portion of the turbomachine. As a result, the diverted exhaust gas should be treated prior to blending with the inlet air.

For the foregoing reasons, there is a need for a method and system for controlling an EGR system. The method and system should allow for the EGR system to reduce the level and/or concentration of emissions within the recirculated exhaust gas stream.

BRIEF DESCRIPTION OF THE INVENTION

In accordance with an embodiment of the present invention, a method of reducing constituents within an exhaust stream, wherein the exhaust stream is generated by a turbomachine; the method comprising: providing at least one exhaust gas recirculation (EGR) system comprising: at least one EGR flow conditioning device, a constituent reduction system, at least one flow control device; wherein the EGR system reduces constituents within the exhaust stream from a first concentration to a second concentration and recirculates the exhaust stream to an inlet section of the turbomachine; modulating the at least one flow control device; utilizing the constituent reduction system to reduce the constituents within the exhaust stream; determining whether constituents within the exhaust stream are within a constituent range; and if constituents are within the constituent range, then modulating the at least one flow control device to allow for the exhaust stream to enter the inlet section.

In accordance with an alternate embodiment of the present invention, a system for reducing constituents within an exhaust stream, wherein the exhaust stream is generated by a turbomachine; the system comprising: at least one exhaust gas recirculation (EGR) system comprising: at least one EGR flow conditioning device, a constituent reduction system, at least one flow control device; wherein the EGR system reduces constituents within the exhaust stream from a first concentration to a second concentration and recirculates the exhaust stream to an inlet section of the turbomachine; wherein the constituents comprise at least one of: SOx, NOx, $CO_2$, water, chloride ions, acids, aldehydes, hydrocarbons, or combinations thereof; and a control system, wherein the control system: determines whether at least one initialization permissive is met; modulates the at least one flow control device; utilizes the EGR flow conditioning device; utilizes the constituent reduction system; determines whether constituents within the exhaust stream are within a constituent range; if constituents are within the constituent range, then the control system modulates the at least one flow control device; and determines whether at least one operational permissive is met.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front," "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention has the technical effect of controlling a system for reducing the concentrations of SOx, NOx, concentrated $CO_2$, and other harmful constituents, all of which may be within a portion of the exhaust (hereinafter "exhaust stream", or the like). The portion of exhaust may then be mixed with the inlet air prior to re-entering the turbomachine, without affecting reliability and availability of the unit.

The present invention may be applied to the variety of turbomachines that produce a gaseous fluid, such as, but not limiting of a heavy duty gas turbine; an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

The EGR system may function while the turbomachine is operating in a mode such as, but not limiting of: spinning reserve, part load, base load, or combinations thereof.

Figure 1:
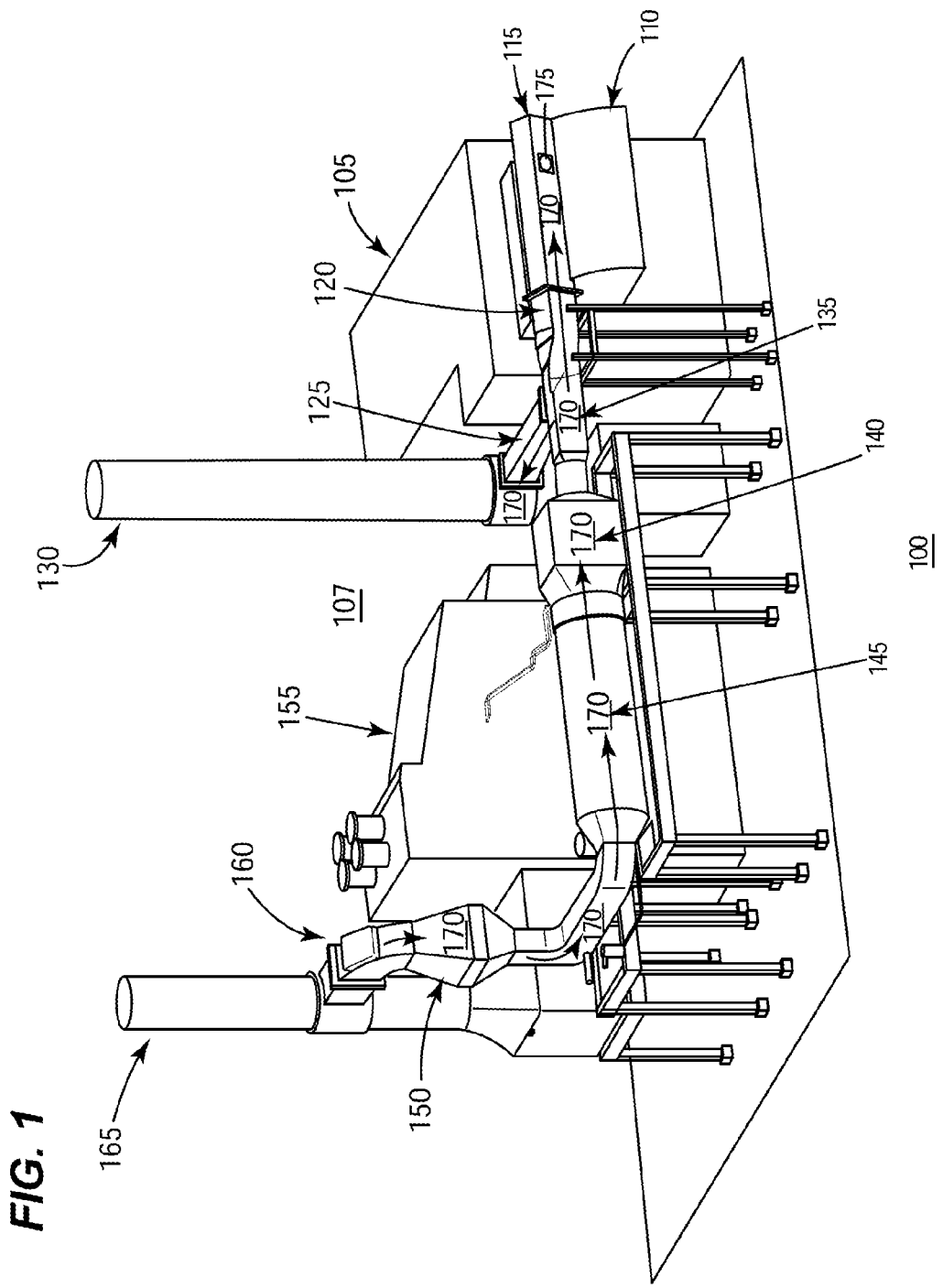
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a site 100, such as but not limiting of a powerplant site, having a turbomachine 105, an EGR system 107, a heat recovery steam generator (HRSG) 155, and an exhaust stack 165. Alternatively, the present invention may be integrated with a site 100 not having the HRSG 155.

The EGR system 107 comprises multiple elements. The configuration and sequence of these elements may be dictated by the composition of the exhaust stream 170 and the type of cooling fluid used by the components of the EGR system 107. Furthermore, alternate embodiments of the EGR system 107 may include additional or fewer components than the components described below. Therefore, various arrangements, and/or configurations, which differ from FIG. 1, may be integrated with an embodiment of the present invention.

As illustrated in FIG. 1, the EGR system 107 comprises: a mixing station 115, an inlet modulation device 120, a bypass modulation device 125, a bypass stack 130, at least one EGR flow conditioning device 135, a downstream temperature conditioning device 140, a constituent reduction system 145, a upstream temperature conditioning device 150, at least one exhaust modulation device 160, and at least one constituent feedback device 175.

Generally, the process used by the EGR system 107 may include: cooling of the exhaust stream 170; reduction and removal of the aforementioned constituents within the exhaust stream 170; and then mixing of the exhaust stream 170 with the inlet air, forming an inlet fluid. While the EGR system 107 operates, the at least one constituent feedback device 175 may continuously monitor the exhaust stream 170 and determine the concentration of the at least one constituents. The at least one constituent feedback device 175 may be positioned adjacent the mixing station 115. Here, the processed exhaust stream 170 flows into the inlet section 110 of the turbomachine 105. The EGR system 107 may reduce the temperature of the exhaust stream 170 to a saturation temperature where the aforementioned constituents may condense and then be removed. Alternatively, the EGR system 107 may also reduce the temperature of, and use a scrubbing process (or the like) on, the exhaust stream 170 to remove the aforementioned constituents.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

The present invention may include a control system, or the like, that has the technical effect of reducing the concentrations of SOx, NOx, concentrated $CO_2$, and other harmful constituents, all of which may be within a portion of the exhaust (hereinafter "exhaust stream", or the like). The control system may receive data on the concentration and/or concentration of the at least one constituent from the at least one constituent feedback device 175. Based in part of this data, the control system may adjustments to the operation of the constituent reduction system 145. This may include for example, but not limiting of, adjustments to: a scrubber recirculation rate, a sorbent injection rate, and a gas temperature.

The control system may integrate the operating requirements and ambient conditions of the turbomachine 105 into the overall controls philosophy. The control system may also manage the temperature of the exhaust stream 170 at each stage in the EGR process. This may allow for the EGR system 107 to efficiently operate.

The control system of the present invention may be configured to automatically and/or continuously monitor the turbomachine 105 to determine whether the EGR system 107 should operate. Alternatively, the control system may be configured to require a user action to the initiate operation of the EGR system 107. An embodiment of the control system of the present invention may function as a stand-alone system. Alternatively, the control system may be integrated as a module, or the like, within a broader system, such as a turbine control or a plant control system.

Figure 2:
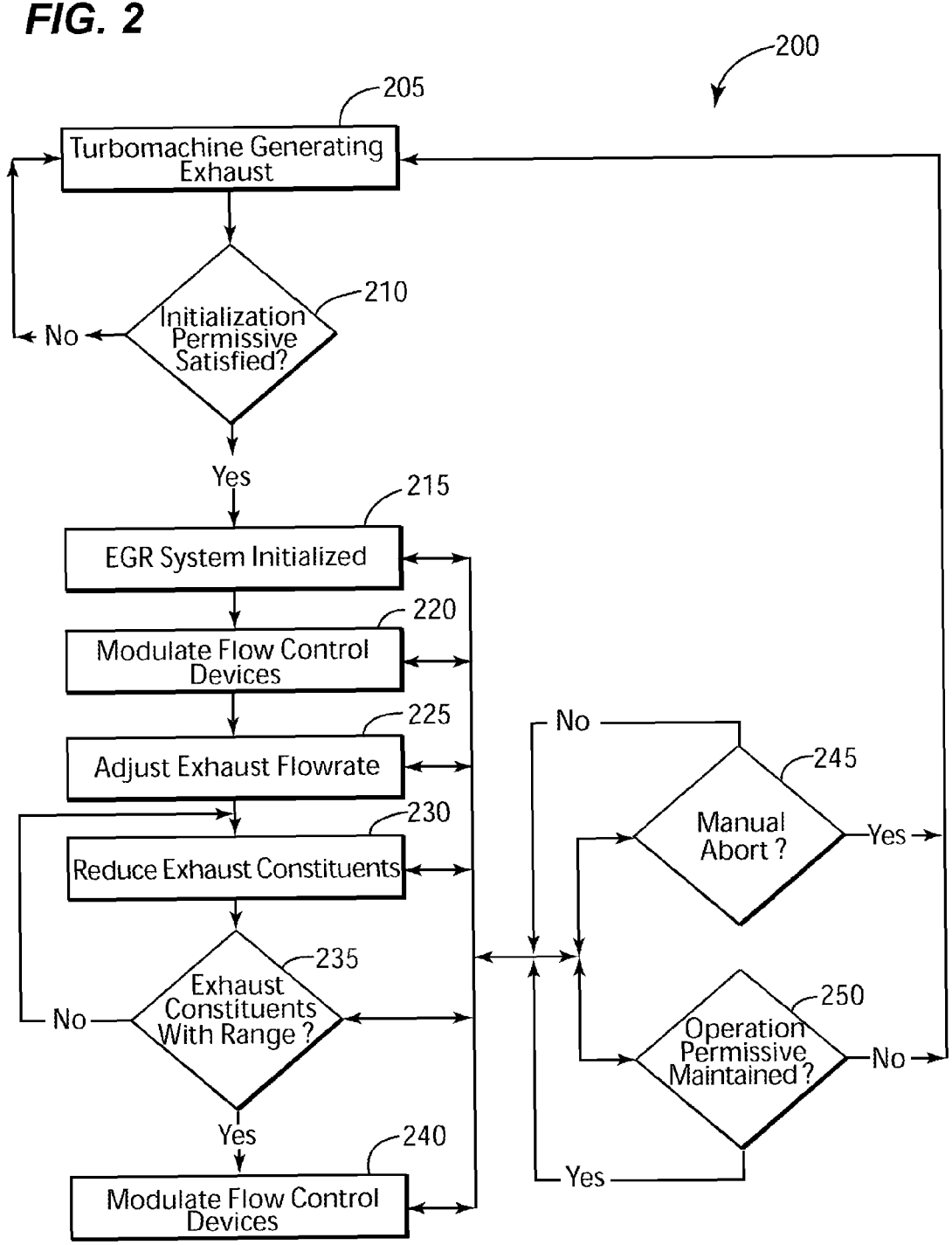
FIG. 2 is a flowchart illustrating an example of a method of utilizing an EGR system to reduce emissions in accordance with an embodiment of the present invention.

Referring now to FIG. 2, which is a flowchart illustrating an example of a method 200 of utilizing an EGR system 107 to reduce emissions in accordance with an embodiment of the present invention. In an embodiment of the present invention the EGR system 107 may be integrated with a graphical user interface (GUI), or the like. The GUI may allow the operator to navigate through the method 200 described below. The GUI may also provide at least one notification of the status of the EGR system 107.

In step 205, of the method 200, the turbomachine 105 generates an exhaust. Depending on either the type and/or operation of the turbomachine 105, the generated exhaust may have a flowrate of about 10,000 Lb/hr to about 50,000,000 Lb/hr and a temperature of about 100 Degrees Fahrenheit to about 1100 Degrees Fahrenheit.

In step 210, the method 200 may determine whether at least one initialization permissive is satisfied. An embodiment of the present invention may require that the at least one initialization permissive is satisfied before the EGR system 107 begins to process the exhaust stream 170. The initialization permissive may generally be considered a permissive that confirms the turbomachine 105 and the EGR system 107 are ready to process the exhaust stream 170. In an embodiment of the present invention, the user may define the at least one initialization permissive.

The at least one initialization permissive may include at least one of: preheating status of the EGR system 107; operational readiness of the EGR system 107 components; status of at least one fault condition of the EGR system 107; and combinations thereof. If the at least one initialization permissive is satisfied then the method 200 may proceed to step 215; otherwise the method 200 may revert to step 205 until the at least one initialization permissive is satisfied.

In step 215, the method 200, may provide a notification to the user that the EGR system 107 is initialized and ready to process the exhaust stream 170. In an embodiment of the present invention, the GUI may provide the notification as a pop-tip window, alarm, or other similar methods.

In step 220, the method 200 may modulate at least one flow control device. A flow control device may be considered a component of the EGR system 107 that allows for the exhaust stream 170 to flow through certain portions of the EGR system 107. The at least one flow control device may have the form of a damper, or the like.

The at least one flow control device is illustrated in FIG. 1 as the inlet modulation device 120, the bypass modulation device 125, and the exhaust modulation device 160. The exhaust modulation device 160 may divert a portion of the total exhaust generated by the turbomachine 105 to the EGR system 107, where the diverted portion becomes the exhaust stream 170. The exhaust modulation device 160 may open and allows for diversion of up to 35% of the total exhaust flow to the exhaust stream 170.

In step 220, the method 200 may move the bypass modulation device 125 to allow for the exhaust stream 170 to flow to the bypass stack 130. The method 200 may also move the exhaust modulation device 160 to allow for the EGR system 107 to receive the exhaust stream 170.

Referring now to step 225, where the method 200 may adjust the flowrate of the exhaust stream 170 within the EGR system 107. The method 200 may utilize at least one EGR flow conditioning device 135 to adjust a flowrate of the exhaust stream 170. The EGR flow conditioning device 135 may apportion up to about 35 percent of the total exhaust flow to the exhaust stream 170. The efficiency of the EGR system 107 may be improved if the flowrate of the exhaust stream 170 is increased. The at least one EGR flow conditioning device 135 allows the exhaust stream 170 to overcome the pressure drop of the EGR system 107, allowing for the at least one exhaust stream 170 to flow throughout the EGR system 107. The at least one EGR flow conditioning device 135 may have the form of a fan, blower, or other similar device, capable of increasing the flowrate of the exhaust stream 170.

The control system may be integrated with a plurality of pressure transmitters, or the like. The transmitters may be located throughout 107; and may determine the pressure drop within the EGR system 107. The control system may receive data on the pressure drop. The control system may then adjust the speed of the EGR flow conditioning device 135 to overcome the pressure drop, as needed.

In step 230, the method 200 may reduce the exhaust constituents. As discussed the exhaust stream 170 generally includes a plurality of constituents of which may be harmful to the turbomachine 105. These constituents include at least one of: SOx, NOx, $CO_2$, water, chloride ions, acids, aldehydes, hydrocarbons, or combinations thereof.

The method 200 may utilize at least one temperature condition device and a constituent reduction system (CRS) 145 to reduce the concentration of constituents from a first concentration to a second concentration, where the second concentration may be substantially less amount of the constituents.

The temperature condition devices 140,150 may reduce the temperature of the exhaust stream 170 to around a saturation temperature. This may allow for the turbomachine 105 to maintain the steady gas turbine output by increasing inlet mass flow. Cooling of the exhaust stream 170 typically results in a higher mass flow of exhaust per unit volume entering the inlet section 110, which generally includes a compressor (not illustrated). The cooling of the exhaust stream 170 may result in the turbomachine 105 generating a higher output and not experiencing a decrease in performance as may occur with a higher average inlet temperature of the inlet fluid.

The cooling process may also allow for the sequestration and removal of the concentrated CO2 constituent in the exhaust stack 165. The temperature condition devices 140, 150 may reduce the exhaust steam 170 to a range of about 35 degrees Fahrenheit to about 100 degrees Fahrenheit.

The temperature condition device is illustrated in FIG. 1, as the downstream temperature conditioning device 140 and the upstream temperature conditioning device 150. The temperature condition devices 140,150 may have the form of a heat exchanger, or other device capable of adjusting the temperature of the exhaust stream 170.

The CRS 145 may utilize at least one component to remove particulates and/or other emissions from the exhaust stream 170. The CRS 145 may also reduce the temperature of the exhaust stream 170 to allow for the particulate to be removed by condensation of the exhaust stream 170, during the aforementioned cooling process.

The CRS 145 may include at least one of: a heat exchanger, a scrubber, a de-mister, a reagent injector, a spray tower, an absorber vessel, an evaporative gas conditioning tower, a wet electrostatic precipitator; mixing station, or combinations thereof.

As illustrated in FIG. 1, an embodiment of the EGR system 107 may include at least one upstream temperature condition device 150 and at least one downstream temperature condition device 140, both of which may have the form of a heat exchanger. The at least one upstream temperature condition device 150 and at least one downstream temperature condition device 140 may be integrated with the constituent reduction system 145.

The control system of the present invention may include, or be integrated with, at least one temperature thermocouple and/or at least one humidity sensor, which collectively may be used to determine the dew point of the exhaust stream 170. After determining a dew point temperature of the exhaust stream 170, the control system may deliver an appropriate amount of cooling fluid, at an appropriate temperature, through the heat exchangers 140,150. This may allow for condensable portions of the constituents to condense and drop out of the exhaust stream 170.

A scrubber is generally considered an air pollution control device that may remove particulates and/or other emissions from industrial exhaust streams. A scrubber may use a "scrubbing process", or the like, involving a liquid to "scrub" unwanted pollutants from a gas stream. A scrubber may receive and then later discharge a scrubber fluid; which may be of a type that allows for the heat transfer required to lower the temperature of the exhaust stream 170, as discussed. The scrubber fluid generally absorbs a portion of the harmful constituents within the exhaust stream 170. The scrubber fluid may be fresh water, sea water, or a combination thereof. An alkaline reagent may be added to the scrubber fluid to increase scrubbing efficiency.

In an embodiment of the present invention, an injection rate of the scrubber fluid may be a function of the concentration of constituents entering the exhaust stream 170. Generally, the concentration of constituents entering the exhaust stream 170 may be a function of the properties of fuel entering the combustion system and the efficiency of combustion. Concentrations of constituents such as, but not limiting of, SOx, H2S, chlorine compounds may be monitored in the exhaust stream 170 by gaseous monitors; which may be positioned downstream and upstream of the scrubber. By measuring the concentration of constituents, determining the efficiency of the scrubber, the control system may then adjust the injection rate of the scrubbing fluid.

In an alternate embodiment of the present invention, the control system may utilize a mass flowrate of the EGR system 107, when determining the injection rate of the scrubbing fluid and/or the flowrate of the cooling fluid(s) utilized by the heat exchangers 140,150.

The CRS 145 may reduce SOx emissions from a first concentration to a second concentration. An embodiment of the present invention may remove from up to about 90 percent of SOx constituents within the exhaust stream 170.

For example, but not limiting of, the SOx emissions reduction may include the first concentration at a range of about 10 parts per billion by weight to about 100 parts per billion by weight; and the second concentration at a range of about 0.1 parts per billion by weight to about 20 parts per billion by weight.

Referring now to step 235, where the method 200 may determine whether the aforementioned constituents have been reduced to an acceptable range. The present invention may utilize a variety of sensors, thermocouples, and other similar devices to determine the concentration of constituents remaining in the exhaust stream 170.

An embodiment of the present invention may utilize a device that provides a direct measurement of the SOx concentration within the exhaust stream 170. The direct measurement may be received by the method 200 and used to adjust the operation of the CRS 145. For example, but not limiting of, if the direct measurement indicates that the SOx concentration is not within the acceptable range, the method 200 may adjust the processing performed by the CRS 145 to bring the SOx concentration within range.

An alternate embodiment of the present invention may utilize a device that provides a pH range of a cooling fluid used with the CRS 145. The pH range may be used to determine the SOx concentration within the exhaust stream 170. The pH range received by the method 200 may be used to adjust the operation of the CRS 145. For example, but not limiting of, if the pH range indicates that the SOx concentration is not within the acceptable range, the method 200 may adjust the operation of the CRS 145 to bring the SOx concentration within range.

If the exhaust constituents are within the range then the method 200 may proceed to step 240; otherwise the method 200 may revert to step 235 until the exhaust constituents are within range.

In step 240, the method 200 may modulate at least one flow control device to allow for the exhaust stream 170 to re-enter the turbomachine 105. After the method 200 determines that constituents have been reduced to the acceptable range, the aforementioned flow control devices may be modulated. Here, the bypass modulation device 125 may modulate towards a close position; and the inlet modulation device 120 may modulate to allow the exhaust stream 170 flow towards the mixing station 115. The mixing station 115 may receive and mix the exhaust steam 170 with the inlet air (not illustrated), forming an inlet fluid. The inlet modulation device 120, EGR flow conditioning device 135, and the mixing station 115 may determine the EGR fraction. The EGR fraction may be considered the portion (percentage, or the like) of the exhaust stream 170 within an inlet fluid entering the inlet section 110. The inlet fluid may then enter the inlet section 110 of the turbomachine 105.

An embodiment of the present invention may include at least one atmospheric condition device, which may receive data on the ambient temperature and humidity. The control system may utilize this data to control the temperature of the exhaust stream 170 entering the mixing station 115. This may allow for the temperature of the exhaust stream 170 to be near the temperature of the inlet air. This may reduce the likelihood of the exhaust stream 170 having a higher temperature tan the inlet air, which may result in a decrease in the efficiency of the turbomachine 105.

In step 245, the method 200 may allow for aborting the operation of the EGR system 107. As illustrated in FIG. 2, the operation of the EGR system 107 may be aborted after the EGR system 107 has been initialized in 215. An embodiment of the present invention, may allow for a user to manually abort the operation of the EGR system 107. Alternatively, the method 200 may be integrated with a system that allows for the automatic aborting of the operation of the EGR system 107. If the operation of the EGR system 107 is aborted then the method 200 may revert to step 205, otherwise the method 200 proceeds to the next step.

In step 250, the method 200 may determine whether at least one operational permissive is maintained during the operation of the EGR system 107. Step 250 may be continuously monitoring the operation of the EGR system 107.

The operational permissive may include at least one of: an EGR fraction; a concentration range of at least one constituent; the constituent reduction system 145 is operating within an operational range; a status of at least one fault condition of the EGR system 107; a combustion dynamics margin; a compressor stall margin; and combinations thereof.

In an embodiment of the present invention, the GUI may notify the user if the operational permissive is not maintained. In an alternate embodiment of the present invention, the method 200 may automatically revert to step 205 if the operational permissive is not maintained.

Figure 3:
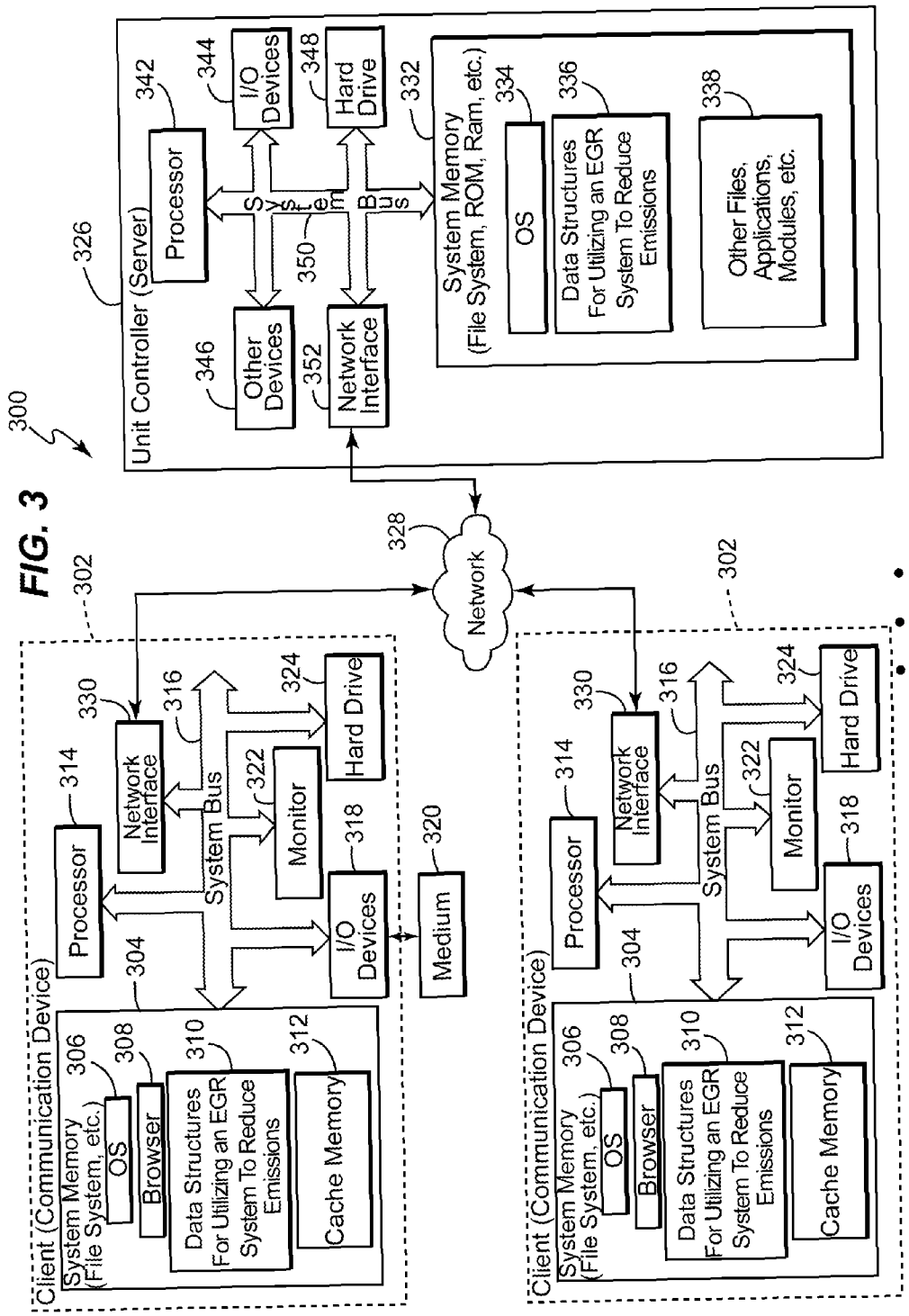
FIG. 3 is a block diagram of an exemplary system of utilizing an EGR system to reduce emissions in accordance with an embodiment of the present invention.

FIG. 3 is a block diagram of an exemplary system 300 of utilizing an EGR system to reduce emissions in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be for example, but not limited to, a computer system, a personal digital assistant, a cellular phone, or similar device capable of sending and receiving an electronic message.

The communication device 302 may include a system memory 304 or local file system. The system memory 304 may include for example, but is not limited to, a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code for utilizing an EGR system to reduce emissions that may be similar or include elements of the method 200 in FIG. 2.

The system memory 304 may further include a template cache memory 312, which may be used in conjunction with the method 200 in FIG. 2 for utilizing an EGR system to reduce emissions.

The communication device 302 may also include a processor or processing unit 314 to control operations of the other components of the communication device 302. The operating system 306, browser 308, and data structures 310 may be operable on the processing unit 314. The processing unit 314 may be coupled to the memory system 304 and other components of the communication device 302 by a system bus 316.

The communication device 302 may also include multiple input devices (I/O), output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to utilize an EGR system to reduce emissions. The I/O devices 318 may include a keyboard and computer pointing device or the like to perform the operations discussed herein.

The I/O devices 318 may also include for example, but are not limited to, disk drives, optical, mechanical, magnetic, or infrared input/output devices, modems or the like. The I/O devices 318 may be used to access a storage medium 320. The medium 320 may contain, store, communicate, or transport computer-readable or computer-executable instructions or other information for use by or in connection with a system, such as the communication devices 302.

The communication device 302 may also include or be connected to other devices, such as a display or monitor 322. The monitor 322 may permit the user to interface with the communication device 302.

The communication device 302 may also include a hard drive 324. The hard drive 324 may be coupled to the system bus 316 by a hard drive interface (not shown in FIG. 3). The hard drive 324 may also form part of the local file system or system memory 304. Programs, software, and data may be transferred and exchanged between the system memory 304 and the hard drive 324 for operation of the communication device 302.

The communication device 302 may communicate with at least one unit controller 326 and may access other servers or other communication devices similar to communication device 302 via a network 328. The system bus 316 may be coupled to the network 328 by a network interface 330. The network interface 330 may be a modem, Ethernet card, router, gateway, or the like for coupling to the network 328. The coupling may be a wired or wireless connection. The network 328 may be the Internet, private network, an intranet, or the like.

The at least one unit controller 326 may also include a system memory 332 that may include a file system. ROM, RAM, and the like. The system memory 332 may include an operating system 334 similar to operating system 306 in communication devices 302. The system memory 332 may also include data structures 336 for utilizing an EGR system to reduce emissions. The data structures 336 may include operations similar to those described with respect to the method 200 for utilizing an EGR system to reduce emissions. The server system memory 332 may also include other files 338, applications, modules, and the like.

The at least one unit controller 326 may also include a processor 342 or a processing unit to control operation of other devices in the at least one unit controller 326. The at least one unit controller 326 may also include I/O device 344. The I/O devices 344 may be similar to I/O devices 318 of communication devices 302. The at least one unit controller 326 may further include other devices 346, such as a monitor or the like to provide an interface along with the I/O devices 344 to the at least one unit controller 326. The at least one unit controller 326 may also include a hard disk drive 348. A system bus 350 may connect the different components of the at least one unit controller 326. A network interface 352 may couple the at least one unit controller 326 to the network 328 via the system bus 350.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of reducing constituents within an exhaust stream, wherein the exhaust stream is generated by a turbomachine; the method comprising:
   diverting a portion of total exhaust stream, considered recirculated exhaust, generated by the turbomachine to an EGR system;
   opening a bypass modulation device to allow the remains of the total exhaust to discharge through a bypass stack;
   adjusting a flowrate of the recirculated exhaust, wherein an EGR flow conditioning device may apportion up to 35% of the total exhaust stream to become the recirculated exhaust stream;
   determining a pressure drop of the EGR system;
   operating the EGR flow conditioning device to adjust the flowrate in a manner that overcomes the pressure drop;
   selecting a constituent present in the recirculated exhaust stream from a list of constituents;
   operating a temperature condition device to cool the recirculated exhaust stream;
   operating a constituent reduction system (CRS) to reduce a concentration of the constituent; wherein the CRS operatively:
      determines a dew point temperature associated with the recirculated exhaust stream;
      cools the recirculated exhaust stream to a temperature below the dew point temperature;
      uses a scrubber to remove particulates of the constituent; wherein the scrubber injects a liquid to scrub the particulates out of the recirculated exhaust stream;
      determines an injection rate of the liquid, wherein the injection rate is function of a concentration of the constituent within the recirculated exhaust stream;
   determining whether the constituent is within a constituent range; and
   if the constituent is within the constituent range, then modulating at least one flow control device to allow for the recirculated exhaust stream to enter an inlet section of the turbomachine.

2. The method of claim 1, wherein the list of constituents comprises: SOx, NOx, $CO_2$, water, chloride ions, acids, aldehydes, or hydrocarbons.

3. The method of claim 1, further comprising determining whether at least one initialization permissive is satisfied.

4. The method of claim 3, wherein the at least one initialization permissive comprises at least one of: preheating status of the EGR system; operational readiness of the EGR system components; status of at least one fault condition of the EGR system; and combinations thereof.

5. The method of claim 1, further comprising determining whether at least one operational permissive is satisfied.

6. The method of claim 5, wherein the at least one operational permissive comprises at least one of: an EGR fraction; a concentration range of the constituent; the constituent reduction system is operating within an operational range; a status of at least one fault condition of the EGR system; a combustion dynamics margin; a compressor stall margin; and combinations thereof.

7. The method of claim 1, wherein the method allows for aborting the operation of the EGR system.

8. The method of claim 1, wherein the step of utilizing the constituent reduction system to reduce the constituent further comprises reducing the temperature of the recirculated exhaust stream to a range from about 35 degrees Fahrenheit to about 100 degrees Fahrenheit.

9. The method of claim 1, wherein the constituent comprises Sox and the constituent reduction system removes up to about 90 percent of SOx constituents within the recirculated exhaust stream.

10. The method of claim 9, further comprising receiving a measurement of a SOx concentration within the recirculated exhaust stream, and adjusting the operation of the constituent reduction system based on that measurement.

11. The method of claim 9, further comprising receiving a pH range of a cooling fluid used with the constituent reduction system, wherein the pH range is used to determine the SOx concentration within the recirculated exhaust stream; and wherein the pH range is used to adjust the operation of the constituent reduction system.

12. The method of claim 1, wherein the constituent reduction system comprises at least one of: a heat exchanger, a scrubber, a de-mister, a reagent injector, a spray tower, an absorber vessel, an evaporative gas conditioning tower, a wet electrostatic precipitator; mixing station, or combinations thereof.

13. The method of claim 1, wherein the step of utilizing the constituent reduction system comprises utilizing at least one constituent feedback device; wherein the at least one constituent feedback device provides data on the constituent within the recirculated exhaust stream.

* * * * *